US009115261B2

(12) United States Patent
Mignani

(10) Patent No.: US 9,115,261 B2
(45) Date of Patent: Aug. 25, 2015

(54) DELAMINATING SHAPED ARTICLE SUBSTRATES HAVING SILICONE COVERINGS ADHERED THERETO

(75) Inventor: Gérard Mignani, Lyons (FR)

(73) Assignee: RHODIA OPERATIONS, Paris (FR)

( * ) Notice: Subject to any disclaimer, the term of this patent is extended or adjusted under 35 U.S.C. 154(b) by 1397 days.

(21) Appl. No.: 12/301,500

(22) PCT Filed: May 22, 2007

(86) PCT No.: PCT/EP2007/054915

§ 371 (c)(1), (2), (4) Date: May 14, 2009

(87) PCT Pub. No.: WO2007/135140

PCT Pub. Date: Nov. 29, 2007

(65) Prior Publication Data

US 2010/0012623 A1 Jan. 21, 2010

(30) Foreign Application Priority Data

May 22, 2006 (FR) .................................... 06 04544

(51) Int. Cl.

| | |
|---|---|
| ***C03C 15/00*** | (2006.01) |
| ***C08J 11/04*** | (2006.01) |
| ***B44C 1/22*** | (2006.01) |
| ***C08J 7/12*** | (2006.01) |
| *B29B 17/02* | (2006.01) |
| *B29K 77/00* | (2006.01) |
| *B29K 83/00* | (2006.01) |
| *B29L 22/02* | (2006.01) |

(52) U.S. Cl.

CPC . *C08J 11/04* (2013.01); *B44C 1/22* (2013.01); *C08J 7/12* (2013.01); *B29B 2017/0296* (2013.01); *B29K 2077/00* (2013.01); *B29K 2083/00* (2013.01); *B29L 2022/027* (2013.01)

(58) Field of Classification Search

None

See application file for complete search history.

(56) References Cited

U.S. PATENT DOCUMENTS

| | | | | |
|---|---|---|---|---|
| 4,161,464 | A | 7/1979 | Nicholas | |
| 5,384,159 | A | 1/1995 | Gillette et al. | |
| 6,471,783 | B1 * | 10/2002 | Gotoh et al. | 134/3 |
| 2003/0228473 | A1 * | 12/2003 | Benayoun et al. | 428/447 |
| 2005/0066995 | A1 * | 3/2005 | Coico et al. | 134/2 |
| 2005/0230347 | A1 * | 10/2005 | Gallas et al. | 216/56 |
| 2006/0006588 | A1 * | 1/2006 | Winget et al. | 264/544 |
| 2006/0055379 | A1 * | 3/2006 | Yamamoto et al. | 323/212 |
| 2006/0102893 | A1 * | 5/2006 | Gerlach et al. | 257/40 |

FOREIGN PATENT DOCUMENTS

| | | |
|---|---|---|
| EP | 0 589 642 A1 | 3/1994 |
| EP | 0 950 684 B1 | 10/1999 |
| GB | 1 229 210 | 4/1971 |

* cited by examiner

*Primary Examiner* — Shamim Ahmed
*Assistant Examiner* — Bradford Gates

(57) ABSTRACT

Shaped article substrates, e.g., plastics, textiles, extrudates, films, etc., having silicone material coverings adhered thereto, are delaminated by treating same with an aqueous solution containing an alkali metal or alkaline earth metal hydroxide and a phase transfer catalyst; particular such shaped article substrates are airbag type of inflatable protection bags having layers of silicone elastomer adhered thereto and used for the protection of the occupants of a motor vehicle.

15 Claims, No Drawings

DELAMINATING SHAPED ARTICLE SUBSTRATES HAVING SILICONE COVERINGS ADHERED THERETO

CROSS-REFERENCE TO EARLIER APPLICATIONS

This application is a national phase of PCT/EP2007/054915, filed May 22, 2007 and designating the United States (published in the French language on Nov. 29, 2007, as WO 2007/135140 A1; the title and abstract were also published in English), which claims foreign priority under 35 U.S.C. §119 of FR 0604544, filed May 22, 2006, each hereby expressly incorporated by reference in its entirety and each assigned to the assignee hereof.

The present invention relates to a method for treating an article comprising a plastic covered with a silicone material, using an aqueous solution comprising an alkali or alkaline-earth metal hydroxide and a phase transfer catalyst. The invention more particularly relates to textile materials covered with a thin film of a silicone elastomer, such as, in particular, the inflatable protective bags, of airbag type, used for protecting occupants of a vehicle.

PRIOR ART

There are many articles based on thermoplastics, especially polyamide or polyester, for example of textile article, film or molded parts type, covered with a silicone material with a view to giving it certain properties, especially impermeability and/or abrasion resistance. These articles are generally manufactured by depositing a crosslinkable silicone composition in order to form a thin film of silicone elastomer.

However, the problem of recycling the components of these articles and especially of recovering the plastic is faced. Specifically, it is very difficult to mechanically dissociate the silicone material from the plastic. There are chemical routes for achieving this, but they have drawbacks in their implementation and they impair the properties of the thermoplastic.

Thus, there is a need to develop a method simple to use that allows optimal recycling of these articles, especially without unfavorably impairing or degrading the plastic matrix.

INVENTION

The Applicant has developed a method for recycling articles comprising at least one plastic covered with a silicone material, using an aqueous solution comprising an alkali or alkaline-earth metal hydroxide and a phase transfer catalyst that does not have the aforementioned drawbacks. Specifically, the combined use of an alkali or alkaline-earth metal hydroxide and of a phase transfer catalyst makes it possible to obtain an effective separation of the silicone material and of the plastic, without leading to a modification of the structure of the plastic, such as polyamide or polyester, especially a degradation of their molecular weight.

The present invention thus relates to a method for treating an article comprising at least one plastic covered with a silicone material that comprises at least the following steps:

a) said article is treated with an aqueous solution comprising an alkali or alkaline-earth metal hydroxide and a phase transfer catalyst, optionally by heating, so as to dissolve or suspend all or some of the silicone material in the aqueous solution; and b) the plastic is separated from the solution.

In step a) of the method according to the invention, the silicone material is separated from the plastic and ends up in the aqueous solution, in dissolved form or in suspension.

Phase transfer catalysts are well known and are customarily used for carrying out a reaction between an anion (for example the hydroxyl ion), located in an aqueous phase, and an organic substrate. The expression "phase transfer catalyst" is thus understood to mean a catalyst capable of moving an anion from an aqueous phase to an organic phase.

According to the invention, the expression "phase transfer catalyst" is particularly understood to mean an amphiphilic molecule that makes it possible to transfer the hydroxyl ion reactants from the aqueous phase of the solution to the organic phase of the silicone. This catalyst has, in particular, a positive counterion which divides its affinity between the aqueous phase and the organic phase. These transporter ions are recycled as the reaction takes place, this is why it is referred to as phase transfer catalysis.

In this method, the hydroxyl ions react with the silicone chains of the silicone material to form silanolates. The silanolate derivatives then end up in dissolved form or in suspension in the aqueous solution.

In the method of the invention, it is possible to use known phase transfer catalysts, in particular those described in the work by Jerry March—Advanced Organic Chemistry, 3rd edition, John Wiley & Sons, 1985, p. 320 et seq.

The phase transfer catalysts used in the method of the invention are preferably onium salts, the onium ions of which derive from nitrogen, phosphorus, arsenic, sulfur, selenium, oxygen, carbon or iodine, coordinated to hydrocarbon-based residues. The onium ions that derive from nitrogen, phosphorus or arsenic will be four-coordinated. The onium ions that derive from sulfur, selenium, oxygen, carbon or S═O will be three-coordinated whereas the onium ions that derive from iodine will be two-coordinated. The hydrocarbon-based residues coordinated to these various elements are optionally substituted alkyl, alkenyl, aryl, cycloalkyl or aralkyl groups, two coordinated hydrocarbon-based residues possibly together forming a single divalent group.

The catalysts preferably used in the method of the invention are the salts of ammonium, phosphonium, pyridinium and/or sulfonium.

As examples of onium ions, mention may be made of the following cations: tetramethylammonium, triethylmethylammonium, tributylmethylammonium, trimethylpropylammonium, tetraethylammonium, tetrabutylammonium, tetramethylphosphonium, tetrabutylphosphonium, ethyltrimethylphosphonium, trimethylpentylphosphonium, octyltrimethylphosphonium, tetraphenylphosphonium, cetyltrimethylphosphonium, cetyltriphenylphosphonium, alkyltris(hydroxymethyl)phosphonium, n-butyltriphenylphosphonium, triphenylphosphonium bearing a hydrocarbon-based chain comprising from 10 to 16 carbon atoms, N-methylpyridinium, N-ethylpyridinium, trimethylsulfonium, triethylsulfonium and triphenylsulfonium.

The nature of the anions bonded to these organic cations is not of critical importance. All "hard" or "intermediate" bases are suitable as the anion. The expression "hard or intermediate base" is understood to mean any anion corresponding to the classic definition given by R. Pearson in Journal of Chem. Ed. 45, pages 581-587 (1968), the terms "hard" and "intermediate" respectively having the meaning of the terms "hard" and "borderline" used in this reference. Among the "hard" or "intermediate" bases that may constitute the anion of said onium salts, mention may be made of the following ions: $F^-$, $Cl^-$, $Br^-$, $I^-$, $PO_4^{3-}$, $HPO_4^-$, $SO_4^{2-}$, $HSO_4^-$, and $NO_3^-$. In particular, chloride and bromide ions are preferred.

Most particularly suitable are the ammonium ions for which the four groups are alkyl groups having 1 to 5 carbon atoms or a benzyl group. As regards the choice of the anion, chloride and bromide ions will be preferred.

Particularly preferred as the catalyst are tetrabutylammonium chloride, cetyltrimethylphosphonium bromide, cetyltriphenylphosphonium chloride, alkyltris(hydroxymethyl) phosphonium chloride or bromide, triphenylphosphonium bromide bearing a hydrocarbon-based chain comprising from 10 to 16 carbon atoms and n-butyltriphenylphosphonium chloride.

The onium salt may be introduced into the aqueous solution, in the solid state or in the form of a solution in one of its solvents, usually water.

As an alkali metal hydroxide, mention may especially be made of LiOH, NaOH and KOH.

Generally from 1 to 60% by weight, preferably from 5 to 50% by weight, more preferably from 10 to 40% by weight of alkali or alkaline-earth metal hydroxide is used in the aqueous solution. The aqueous solution may comprise from 0.1 to 10 mol %, preferably from 1 to 3 mol %, of phase transfer catalyst relative to the number of moles of hydroxyl ions.

The plastic may take up various forms capable of being covered by a silicone material; and may especially be in the form of yarns, fibers, textile articles, molded parts, extruded parts or films. The textile articles may be woven, non-woven or knitted, for example.

By way of example, mention may be made of the airbags used for protecting the occupants of a vehicle, conveyor belts, fire-resistant fabrics, thermal insulation, compensators, such as flexible sealing sleeves for pipe work, tubes, films, clothing or else flexible materials intended to be used in interior or exterior textile architecture, such as tarpaulins, tents, stands and marquees.

The plastic is preferably a thermoplastic, especially based on polyamide, polyester and/or polyolefin.

As the type of polyamide, mention may be made, for example, of semicrystalline or amorphous polyamides such as aliphatic or semi-aromatic polyamides. Mention may especially be made of the (co)polyamides PA-6, PA-6,6, PA-4,6, PA-6,10, PA-6,12, PA-11, PA-12, and/or blends, such as the polyamides PA-6/6,6.

As the type of polyester, mention may be of polyethylene terephthalate (PET) which denotes both a homopolymer obtained solely from terephthalic acid monomers or its esters such as dimethyl terephthalate and ethylene glycol, and copolymers.

As the type of polyolefin, mention may be made of polyethylenes and polypropylenes.

There are many crosslinkable liquid silicone formulations capable of being used to form a coating which makes it possible to provide functionalities to a wide number of plastics. It is possible to use a wide variety of multi-component, two-component or single-component polyorganosiloxane (POS) formulations that crosslink at room temperature or at high temperature via polyaddition, hydrosilylation, radical or polycondensation reactions. It should be noted that the silicone compositions are amply described in the literature and especially in the work by Walter Noll, “Chemistry and Technology of Silicones”, Academic Press, 1968, 2nd edition, especially pages 386 to 409.

The silicone coating for the plastic may be composed of a silicone oil or a silicone resin for example.

The method of the invention is particularly suitable for recycling a plastic covered with a silicone material that is crosslinked by a polycondensation reaction under the action of moisture, generally in the presence of a catalyst known in the field (see, for example, Application FR 2865223).

The treatment step a) of the method of the invention may be carried out in a container, such as a tank or a basin for example. In this step, it is optionally possible to heat the reaction medium to a temperature between 20 and 100° C. In this step, the article may remain in contact with the solution for one to a few hours, for example between 1 and 3 hours, or even up to 24 hours, depending on the amount of silicone material covering said plastic. The reaction medium may optionally be stirred.

In particular, it is possible in the treatment step a) to introduce the article comprising at least one plastic covered with a silicone material in ground or chopped form.

The separation of the plastic and of the solution in step b) of the method of the invention may be carried out by withdrawal of this plastic or by discharge of the aqueous solution. The plastic may optionally be washed with water and/or be dried by conventional means.

It is also possible to add to the method of the invention a step c) in which the plastic is treated with an acid, especially for neutralizing the hydroxyl ions that remain in said plastic. For this purpose, it is possible to use an aqueous solution comprising an acid, especially acetic acid, formic acid, phosphoric acid, stearic acid or adipic acid. The plastic may optionally be washed with water and/or be dried by conventional means.

The recovered plastic can then be converted into granules.

A specific language is used in the description in order to facilitate the understanding of the principle of the invention. It should nevertheless be understood that no limitation of the scope of the invention is envisaged by the use of this specific language. The expression “and/or” includes the meanings and, or, and also all the other possible combinations of the elements connected to this expression.

Other details or advantages of the invention will appear more clearly in light of the examples given below solely by way of indication.

EXPERIMENTAL SECTION

Example 1

A 100 g piece of an airbag made of polyamide 66, covered with a silicone resin crosslinked by polycondensation was immersed in 20 g of a 50% by weight NaOH aqueous solution comprising 1% by weight of tetrabutylammonium chloride. After 3 hours of contact at a temperature of 60° C., the piece was removed from the solution. It was washed with water and it was then rinsed with an aqueous solution containing 5% by weight of acetic acid. It was then rewashed with water until the pH of the water was neutral.

Analysis by X-ray fluorescence made it possible to observe the absence of any silicon-containing derivative at the surface of the piece following treatment. Observation by DSC made it possible to verify that the molecular weight of the polyamide had not been modified following the treatment.

Example 2

Comparative

A 100 g piece of an airbag made of polyamide 66, covered with a silicone resin crosslinked by polycondensation/polyaddition, was immersed in 20 g of a 50% by weight NaOH aqueous solution. After 3 hours of contact at a temperature of 60° C., the piece was removed from the solution. It was washed with water and it was then rinsed with an aqueous solution containing 5% by weight of acetic acid. It was then rewashed with water until the pH of the water was neutral.

Analysis by X-ray fluorescence made it possible to observe the presence of all the silicon-containing derivatives at the surface of the piece following treatment. These polyamide pieces were retreated and left to react at 100° C. for 24 h. Analysis by X-ray fluorescence made it possible to observe the presence of the majority of the silicon derivative at the surface of the piece.

Example 3

A 100 g piece of an airbag made of polyamide 66, covered with a silicone resin crosslinked by polycondensation/polyaddition was immersed in 20 g of a 50% by weight NaOH aqueous solution comprising 0.5% by weight of tetrabutylphosphonium chloride. After 16 hours of contact at a temperature of 100° C., the piece was removed from the solution. It was washed with water and it was then rinsed with an aqueous solution containing 5% by weight of acetic acid. It was then rewashed with water until the pH of the water was neutral.

Analysis by X-ray fluorescence made it possible to observe the absence of any silicon-containing derivative at the surface of the piece following treatment. Observation by DSC made it possible to verify that the molecular weight of the polyamide had not been modified following the treatment.

Example 4

A 100 g piece of an airbag made of polyamide 66, covered with a silicone resin crosslinked by polycondensation/polyaddition was immersed in 20 g of a 50% by weight NaOH aqueous solution comprising 0.5% by weight of trimethyldodecylphosphonium chloride. After 16 hours of contact at a temperature of 100° C., the piece was removed from the solution. It was washed with water and it was then rinsed with an aqueous solution containing 5% by weight of acetic acid. It was then rewashed with water until the pH of the water was neutral.

Analysis by X-ray fluorescence made it possible to observe the absence of any silicon-containing derivative at the surface of the piece following treatment. Observation by DSC made it possible to verify that the molecular weight of the polyamide had not been modified following the treatment.

The invention claimed is:

1. A method for delaminating a shaped article substrate having a silicone material covering adhered thereto, comprising at least the following steps:

a) treating said shaped article substrate in ground or chopped form with an aqueous solution comprising an alkali or alkaline-earth metal hydroxide and a phase transfer catalyst, optionally heating same, to dissolve or suspend all or a fraction of the silicone material in the aqueous solution; and b) separating the shaped article substrate from the solution, wherein said aqueous solution comprises from 0.1 mol % to 10 mol % of phase transfer catalyst relative to the number of moles of hydroxyl ions;

and wherein the molecular weight of the shaped article is not modified.

2. The method as defined by claim 1, said phase transfer catalyst comprising an onium salt, wherein the onium ions of the onium salt is derived from nitrogen, phosphorus, arsenic, sulfur, selenium, oxygen, carbon or iodine, and the onium salt is coordinated to hydrocarbon-based residues.

3. The method as defined by claim 1, said phase transfer catalyst comprising an ammonium, phosphonium, pyridinium and/or sulfonium salt.

4. The method as defined by claim 1, said phase transfer catalyst comprising a tetramethylammonium, triethylmethylammonium, tributylmethylammonium, trimethylpropylammonium, tetraethylammonium, tetrabutylammonium, tetramethylphosphonium, tetrabutylphosphonium, ethyltrimethyiphosphonium, trimethylpentylphosphonium, octyltrimethylphosphonium, tetraphenylphosphonium, cetyltrimethylphosphonium, cetyltriphenylphosphonium, alkyltris(hydroxymethyl)phosphonium, n-butyltriphenylphosphonium, triphenylphosphonium bearing a hydrocarbon-based substituent having from 10 to 16 carbon atoms, N-methylpyridinium, N-ethylpyridinium, trimethylsulfonium, triethylsulfonium and/or triphenylsulfonium salt.

5. The method as defined by claim 1, said aqueous solution comprising an alkali metal hydroxide selected from the group consisting of LiOH, NaOH and KOH.

6. The method as defined by claim 1, said shaped article substrate being selected from the group consisting of plastics, yarns, fibers, textiles, molded parts, extrudates and films.

7. The method as defined by claim 1, said shaped article substrate comprising polyamide, polyester and/or polyolefin.

8. The method as defined by claim 1, said silicone material covering being prepared from a polyorganosiloxane formulation, said polyorganosiloxane formulation being a multi-component, a bi-component or a mono-component formulation that crosslinks by polyaddition, hydrosilylation, radical or polycondensation reactions.

9. The method as defined by claim 8, said silicone material covering having been crosslinked by a polycondensation reaction under the action of moisture, in the presence of a catalyst.

10. The method as defined by claim 1, wherein step a), the reaction medium is heated to a temperature ranging from 20 to 100° C.

11. The method as defined by claim 1, whereafter step b), the recovered shaped article substrate is washed with water and/or dried.

12. The method as defined by claim 1, further comprising a step c) of treating the recovered shaped article substrate with an acid and optionally washing with water and/or drying same.

13. The method as defined by claim 1, said shaped article substrate having a silicone material covering adhered thereto comprising a vehicular airbag.

14. A method for delaminating a shaped article substrate having a silicone material covering adhered thereto, comprising at least the following steps:

a) treating said shaped article substrate in ground or chopped form with an aqueous solution comprising an alkali or alkaline-earth metal hydroxide and a phase transfer catalyst, optionally heating same, to dissolve or suspend all or a fraction of the silicone material in the aqueous solution; and b) separating the shaped article substrate from the solution, wherein said aqueous solution comprises from 0.1 mol % to 10 mol % of phase transfer catalyst relative to the number of moles of hydroxyl ions and wherein the phase transfer catalyst comprises an onium salt, wherein the anions linked to the onium salt are selected from the group consisting of $F^-$, $Cl^-$, $Br^-$, $I^-$, $PO_4^{3-}$, $HPO_4^-$, $SO_4^{2-}$, $HSO_4^-$, and $NO_3^-$, and wherein the molecular weight of the shaped article is not modified.

15. The method as defined in claim 14, wherein the anion is $Cl^-$ or $Br^-$.

* * * * *